US012763495B2

(12) United States Patent
Zhang et al.

(10) Patent No.: US 12,763,495 B2
(45) Date of Patent: Oct. 13, 2026

(54) CONNECTING TERMINAL

(71) Applicant: Tyco Electronics (Shanghai) Co., Ltd., Shanghai (CN)

(72) Inventors: Zhimin Zhang, Shanghai (CN); Yongjian (Justin) Huang, Shanghai (CN); Chunjie Hu, Shanghai (CN); Wenfang (Felix) Zhang, Shanghai (CN); Tongbao (Tim) Ding, Shanghai (CN); Jinyu Zhang, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 378 days.

(21) Appl. No.: 18/494,903

(22) Filed: Oct. 26, 2023

(65) Prior Publication Data

US 2024/0145942 A1 May 2, 2024

(30) Foreign Application Priority Data

Oct. 26, 2022 (CN) ......................... 202211316270.4

(51) Int. Cl.
*H01R 4/02* (2006.01)
*H01R 4/2495* (2018.01)
*H01R 43/02* (2006.01)

(52) U.S. Cl.
CPC ............ *H01R 4/023* (2013.01); *H01R 4/026* (2013.01); *H01R 4/2495* (2013.01); *H01R 43/0207* (2013.01)

(58) Field of Classification Search
None
See application file for complete search history.

(56) References Cited

U.S. PATENT DOCUMENTS

| | | | | |
|---|---|---|---|---|
| 4,692,122 A * | 9/1987 | Montalbano | ........... | H01R 4/184 29/863 |
| 5,423,474 A * | 6/1995 | Kanagawa | ........... | H01R 4/2495 228/136 |
| 8,882,549 B2 * | 11/2014 | Suzuki | .................. | H01R 4/188 439/882 |
| 9,391,376 B2 * | 7/2016 | Kawamura | ............ | H01R 43/02 |
| 12,244,114 B2 * | 3/2025 | Schroll | .................. | H01R 4/184 |
| 2020/0287300 A1 * | 9/2020 | Li | .......................... | H01R 4/188 |

* cited by examiner

*Primary Examiner* — Ross N Gushi
(74) *Attorney, Agent, or Firm* — Barley Snyder

(57) ABSTRACT

A connecting terminal includes a bottom plate having a plurality of bumps and/or a plurality of recesses arranged on a surface of the bottom plate, a first arm extending from a first end of the first arm to a second end of the first arm, and a second arm extending from a first end of the second arm to a second end of the second arm. The first end of the first arm and the first end of the second arm are respectively coupled to a pair of sides of the bottom plate, and the first arm, the bottom plate, and the second arm form a space for accommodating a wire. The bumps and/or the recesses scrape an insulated layer of a wire and form an electrical connection with the wire.

21 Claims, 7 Drawing Sheets

CONNECTING TERMINAL

CROSS-REFERENCE TO RELATED APPLICATIONS

This application claims the benefit of the filing date under 35 U.S.C. § 119(a)-(d) of Chinese Patent Application No. 202211316270.4, filed on Oct. 26, 2022.

FIELD OF THE INVENTION

The present disclosure relates to electrical connection technology, in particular, to a connecting terminal for realizing an electrical connection by using ultrasonic welding.

BACKGROUND

A wire is a wire product often used in the industrial field to transmit electrical energy. According to its basic composition, the wire is divided into a metallic wire core and an electrical insulated layer, wherein the electrical insulated layer encloses the metallic wire core to isolate electricity. Welding technology is mostly used in existing technologies to connect wires. Before welding the wire, operating personnel need to strip the wire so that the metallic wire core of the wire is exposed on the outside for wiring operations. In addition, cold-pressed terminals are also used in the industrial field to connect wires, and the advantage of using cold-pressed terminals is that there is no need to pre-strip the wire. However, limited by the structure of the terminal, the cold-pressed terminal can only connect a limited number of wires at the same time, for example, in existing technologies, one cold-pressed terminal can only connect up to three wires at the same time.

Ultrasonic welding is a process that uses high-frequency vibrations to transmit energy to the surfaces of two objects that need to be welded. With the application of pressure, the two surfaces rub against each other, resulting in fusion between molecular layers. Currently, ultrasonic welding can be used for connecting metals to each other.

SUMMARY

A connecting terminal includes a bottom plate having a plurality of bumps and/or a plurality of recesses arranged on a surface of the bottom plate, a first arm extending from a first end of the first arm to a second end of the first arm, and a second arm extending from a first end of the second arm to a second end of the second arm. The first end of the first arm and the first end of the second arm are respectively coupled to a pair of sides of the bottom plate, and the first arm, the bottom plate, and the second arm form a space for accommodating a wire. The bumps and/or the recesses scrape an insulated layer of a wire and form an electrical connection with the wire.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EXEMPLARY EMBODIMENTS

Figure 1:
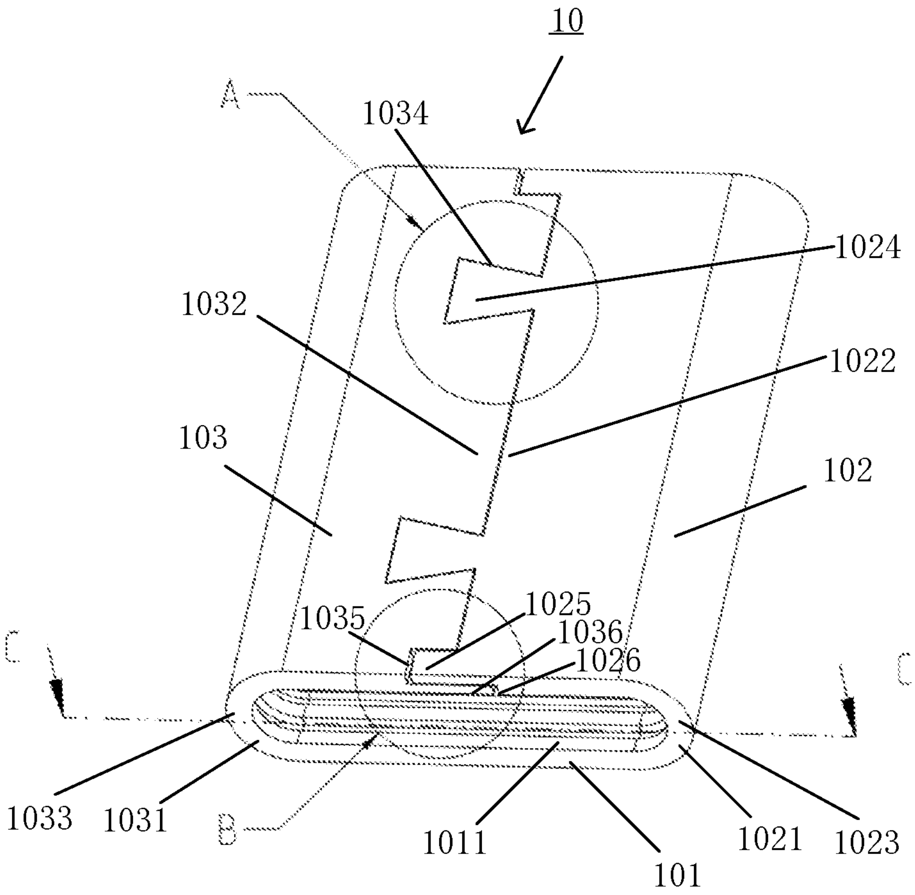
FIG. 1 is a three-dimensional schematic diagram of a connecting terminal according to one embodiment of the present invention.

The implementation and usage of the embodiments are discussed in detail below. However, the specific embodiments discussed herein are merely intended to illustrate specific ways of implementing and using the present disclosure, and are not intended to limit the scope of the present disclosure. When describing the components, the expressions herein, such as "upper end", "lower end", "upper", "lower", "left", and "right", are not absolute, but relative. When the components are arranged as shown in the drawings, these expressions are appropriate, but when the positions of these components in the drawings are altered, these expressions should be altered accordingly.

Figure 4:
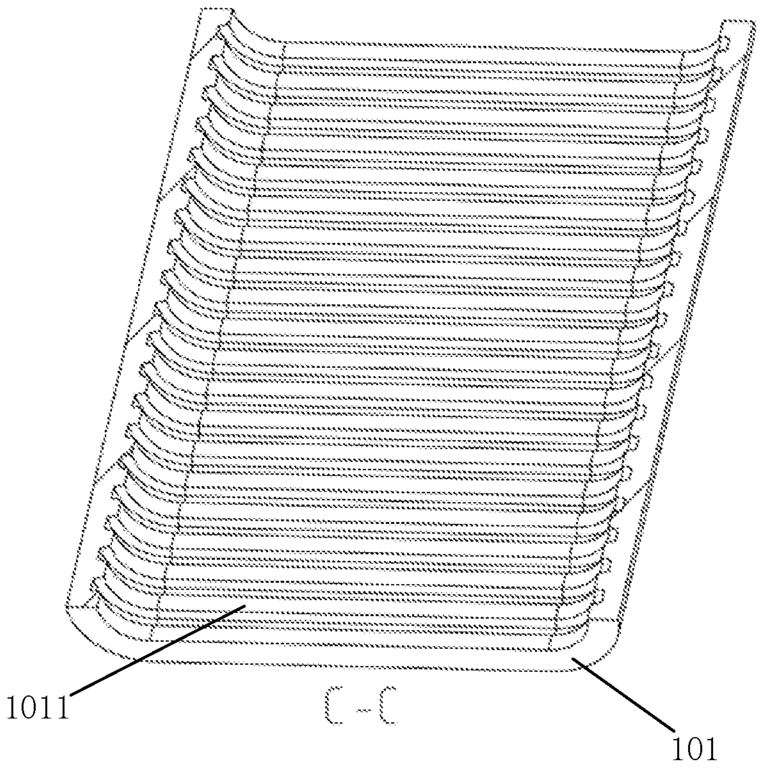
FIG. 4 is a perspective sectional schematic diagram after cutting along the C-C line in FIG. 1.
Figure 5:
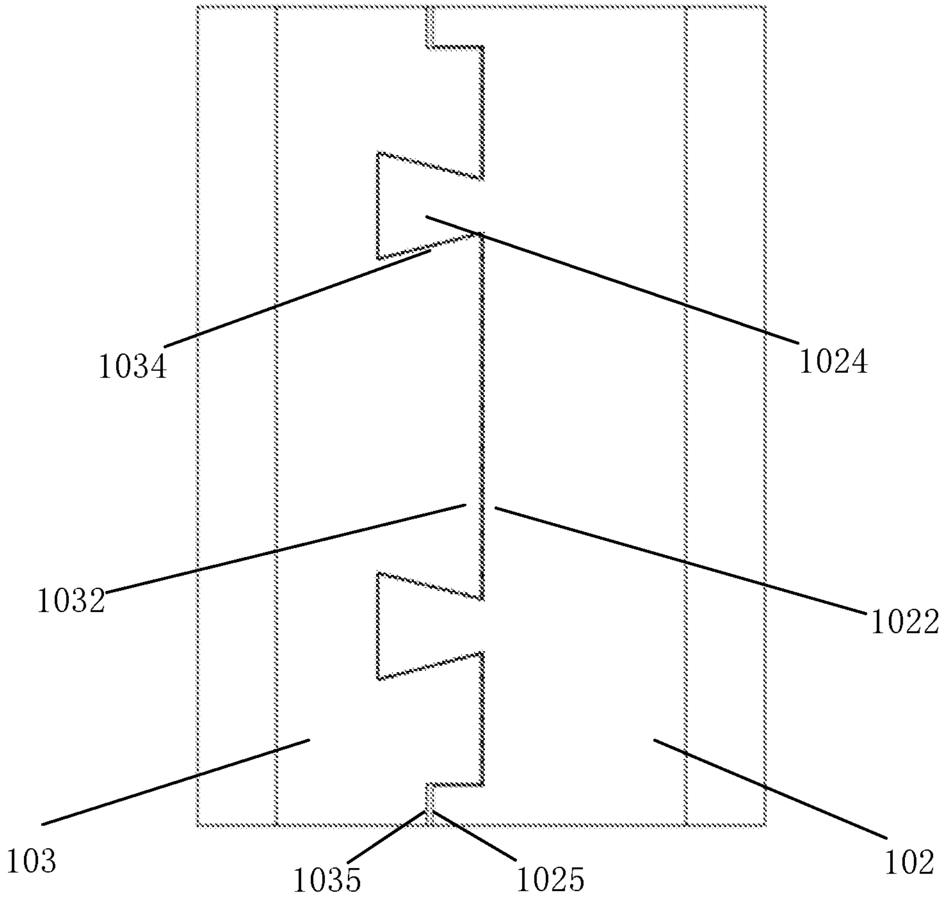
FIG. 5 is a top schematic diagram of a connecting terminal according to an embodiment.
Figure 6:
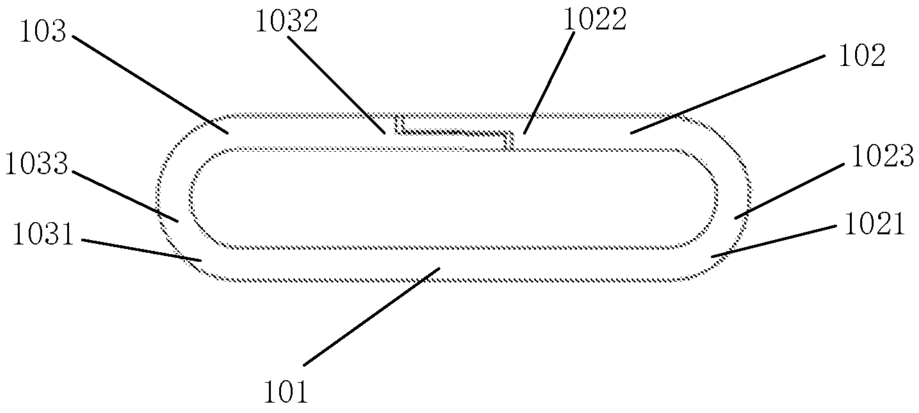
FIG. 6 is a front schematic diagram of a connecting terminal according to an embodiment.

FIG. 1 shows a schematic diagram of a connecting terminal according to one embodiment of the present invention. Connecting terminal 10 is used to accommodate a wire and realize an electrical connection with the wire, and in this embodiment, the connecting terminal is configured to be electrically connected to the wire through ultrasonic welding. Terminal 10 can be made of copper and includes a bottom plate 101, a first arm 102, and a second arm 103. As shown in FIG. 4, the bottom plate 101 includes a plurality of bumps 1011 arranged on its surface.

Each bump 1011 is configured to scrape an insulated layer of the wire, thereby realizing an electrical connection with the wire. In this embodiment, the bump 1011 is configured to scrape the insulated layer of the wire when using ultrasonic welding. A first arm 102 is arranged to extend from a first end 1021 of the first arm to a second end 1022 of the first arm 102, as shown in FIG. 1. A second arm 103 is arranged to extend from a first end 1031 of the second 103 arm to a second end 1032 of the second arm 103. The first end 1021 of the first arm 102 and the first end 1031 of the second arm 103 are coupled to left and right sides of bottom plate 101 respectively, and first arm 102, bottom plate 101, and second arm 103 form a space for accommodating the wire.

Figure 7:
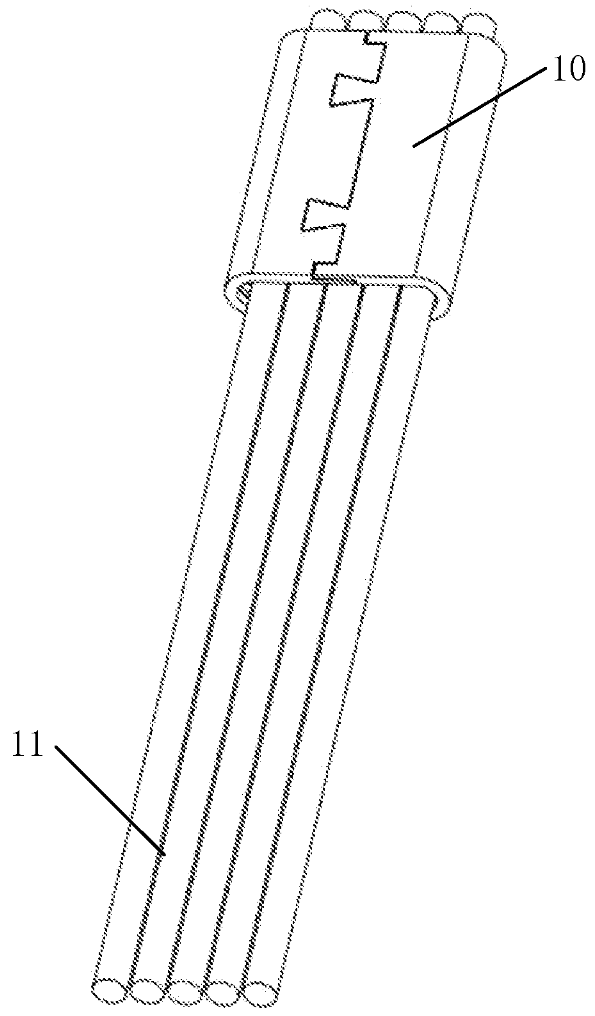
FIG. 7 is a perspective schematic diagram of a connecting terminal with wires placed according to an embodiment.

Before use, multiple wires 11 need to be placed in parallel on bottom plate 101, as shown in FIG. 7. When ultrasonic welding is being used, high-frequency vibration waves are transmitted to connecting terminal 10 and wires 11, causing terminal 10 and wires 11 to vibrate. Then, bumps 1011 on bottom plate 101 of the terminal 10 scrape the insulated layers around wires 11, such that metallic wire cores of wires 11 are exposed on the outside. Under the influence of ultrasonic waves, the metallic wire cores of wires 11 further form electrical connections with the inner wall of terminal 10 (including the surface of bottom plate 101).

Besides the aforementioned bumps 1011, a plurality of recesses arranged on bottom plate 101 can also scrape the insulated layers of wires 11. For example, they can scrape the insulated layers of wires and thus form electrical connections with wires 11 when using ultrasonic welding.

The space formed among first arm 102, bottom plate 101, and second arm 103, used to accommodate wires 11, can limit wires 11 to prevent them from leaving terminal 10 during vibration. When terminal 10 is used to connect wires 11, the number of wires 11 is basically unlimited, and there is no need to pre-strip the insulated layers of wires 11, which reduces the complexity of processing and saves processing time. After that welding is completed, connecting terminal 10 can provide reliable protection force for the welding point. Moreover, connecting terminal 10 can be easily applied in industrial production as it can be used to realize welding though a traditional ultrasonic welding equipment.

In this embodiment, the first arm 102 includes a first bend portion 1023 arranged thereon, and the second arm 102 includes a second bend portion 1033 arranged thereon. By setting the bend portions 1023, 1033, first arm 102, bottom plate 101, and second arm 103 can collectively enclose and accommodate wires 11 placed in terminal 10. The structure of the bend portion 1023, 1033 may also be right-angle bend or oblique-angle bend, besides the rounded bend as shown in FIG. 1. Furthermore, in order to ensure better electrical connections, in addition to arranging bumps 1011 or recesses on bottom plate 101, a plurality of bumps 1011 or a plurality of recesses are also arranged on the inner walls of first arm 102 and second arm 103. During the process that ultrasonic welding is applied to terminal 10, some metallic wire cores of wires 11 can also form electrical connections with inner walls of first arm 102 or second arm 103.

As shown in FIG. 1, the second end 1022 of first arm 102 is arranged to be coupled to second end 1032 of second arm 103, such that first arm 102, bottom plate 101, and second arm 103 form a closed space. When ultrasonic welding is applied to terminal 10, wires 11 in terminal 10 vibrate. Therefore, the closed space formed by terminal 10 can prevent wires 11 from leaving terminal 10, thereby ensuring the electrical connection for each wire 11 in terminal 10.

Figure 2:
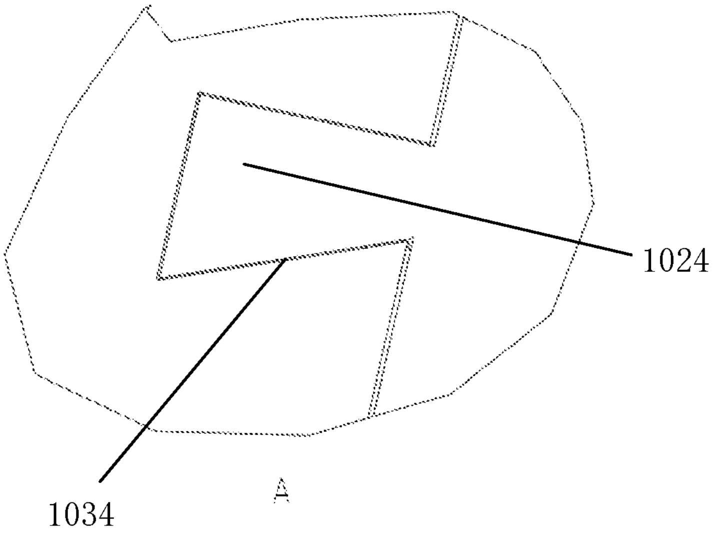
FIG. 2 is an enlarged schematic diagram of region A in FIG. 1.
Figure 3:
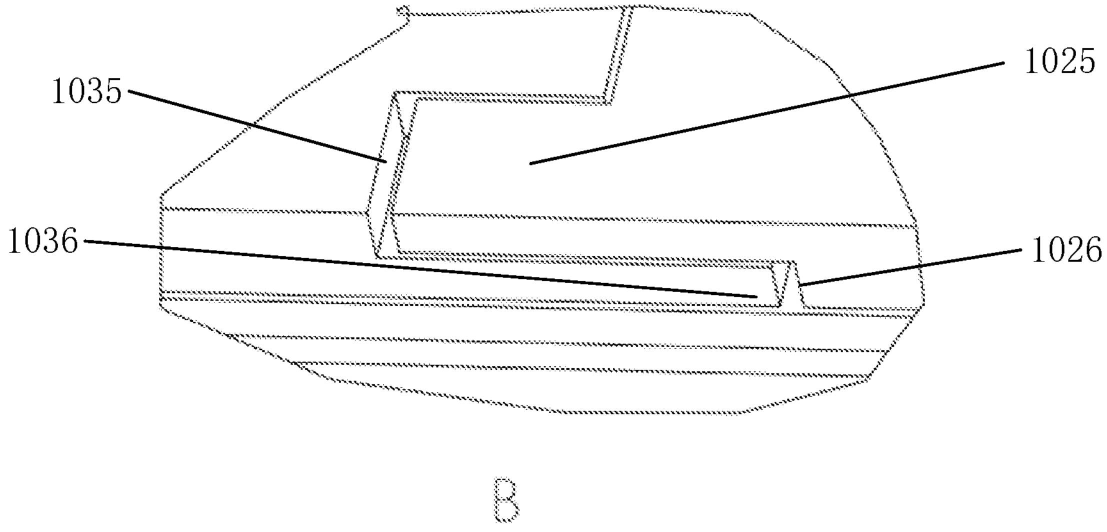
FIG. 3 is an enlarged schematic diagram of a region B in FIG. 1.

FIGS. 2 and 3 show the coupling structure between the second end 1022 of the first arm 102 and the second end 1032 of the second arm 103 in detail. As shown in FIG. 2, first arm 102 includes a dovetail joint 1024 arranged on second end 1022 of first arm 102, and second arm 103 includes a dovetail groove 1034 arranged on second end 1032 of second arm 103. Dovetail joint 1024 is configured to be inserted into dovetail groove 1034, such that dovetail joint 1024 fixedly mates to dovetail groove 1034. The arrangement of dovetail joint 1024 and dovetail groove 1034 allows second end 1022 of first arm 102 and second end 1032 of second arm 103 to interlock with each other, thereby achieving coupling.

As shown in FIG. 3, first arm 102 includes a first tenon 1025 and a first groove 1026 that are disposed on second end 1022 of the first arm, wherein first tenon 1025 and first groove 1026 are stacked adjacently. Second arm 103 includes a second groove 1035 and a second tenon 1036 that are disposed on second end 1032 of second arm, wherein second groove 1035 and second tenon 1036 are stacked adjacently. First tenon 1025 is configured to mate with second groove 1035, and first groove 1026 is configured to mate with second tenon 1036. In this embodiment, above tenons 1025, 1036 and grooves 1026, 1035 are arranged from the front end to the rear end of second ends of first arm 102 and second arm 103. When ultrasonic welding is performed on terminal 10, a metal connection is formed between first tenon 1025 and second groove 1035, and a metal connection is formed between first groove 1026 and second tenon 1036. Of course, if some material of terminal 10 is plastic, a plastic connection can also be formed between the tenon and the groove. In addition to the coupling way implemented in this embodiment between second end 1022 of first arm 102 and second end 1032 of second arm 103, persons skilled in the art may also think of a structure of other coupling way.

Figure 8:
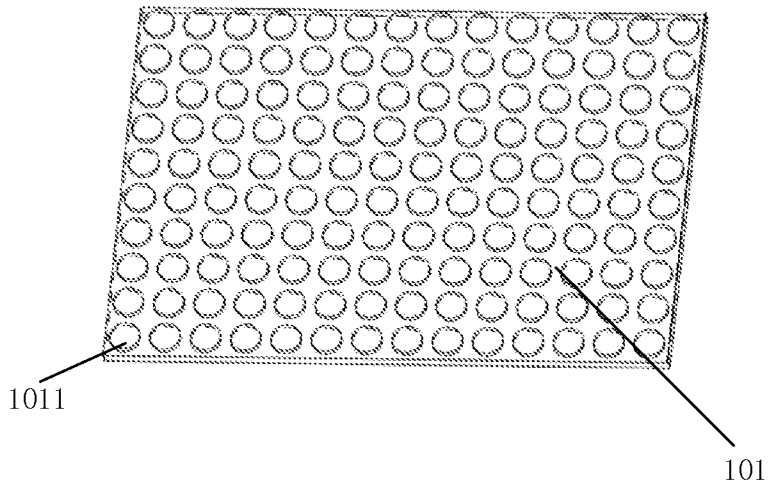
FIG. 8 is a schematic diagram of a bottom plate according to another embodiment.
Figure 9:
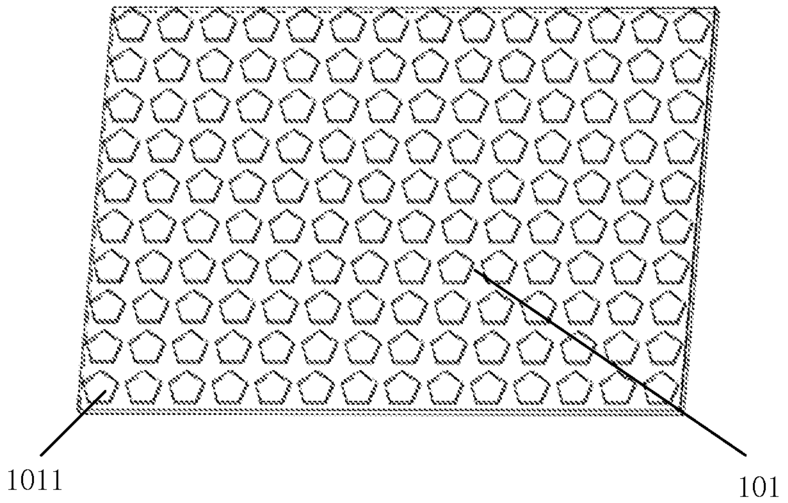
FIG. 9 is a schematic diagram of a bottom plate according to another embodiment.

FIG. 4 shows the structure of the surface of bottom plate 101 after connecting terminal 10 is cut open along the CC line. Bumps 1011 on the surface of bottom plate 101 have shapes of long strips, and long strip-shaped bumps 1011 are regularly arranged in a large area on the surface of bottom plate 101. Long strip-shaped bumps 1011 can be formed through a stamping process. In other embodiments, as shown in FIGS. 8 and 9, bumps 1011 on the surface of bottom plate 101 can also be circular or pentagonal, and circular or pentagonal bumps 1011 are regularly arranged in a large area on the surface of bottom plate 101. Circular or pentagonal bumps 1011 can be formed through an etching process. In fact, as long as the surface of bottom plate 101 has a rugged structure, the surface of bottom plate 101 scrapes wire 11 during the ultrasonic welding process, thereby forming an electrical connection with wire 11. Therefore, bumps 1011 or recesses arranged on the surface of bottom plate 101 can be circular or any other polygonal shape. Moreover, bumps 1011 or recesses can be formed by a stamping or etching process. Furthermore, bump 1011 or a surface where bump 1011 is located, and the recess or a surface where the recess is located, are arranged to be processed by a treatment process that increases roughness of a surface, such as knurling or sand blast, to enhance electrical connections. Bumps or recesses arranged on the inner walls of first arm 102 and second arm 103 can also be set or treated in a similar manner to achieve a similar effect.

To ensure that each wire 11 contacts the inner wall of terminal 10, it is recommended to place wires 11 in a single row in terminal 10 as shown in FIG. 7. Therefore, the height of a space for accommodating wire 11 in terminal 10 is greater than or equal to the outer diameter of wire 11, and less than or equal to twice the outer diameter of wire 11. In this embodiment, the height of space for accommodating wire 11 refers to the distance between the highest horizontal plane of bottom plate 101 and the lowest horizontal plane of the upper inner wall of first arm 102 or second arm 103. The width of a space for accommodating wire 11 in terminal 10 is greater than or equal to the outer diameter of the wire multiplied by the number of wires.

In order to enable bump 1011 or the recess to scrape off the insulated layer of wire 11 completely, the height of the bump or the depth of the recess should be greater than or equal to the thickness of the insulated layer of wire 11. Still further, it is unsuitable for the diameter of wire 11 to be too small after being scraped, otherwise it is easy to break the wire or result in a poor electrical connection. Therefore, according to engineering experience, the height of bump 1011 or the depth of the recess should be less than or equal to one fifth of the outer diameter of the wire.

Although the present invention has been described herein with reference to specific examples, these specific examples are only intended to be exemplary and not to limit the present invention. It is obvious to those skilled in the art that the disclosed embodiments may be changed, added or deleted without departing from the spirit and scope of the invention.

What is claimed is:

1. A connecting terminal, comprising:
- a bottom plate having a plurality of bumps and/or a plurality of recesses arranged on a surface of the bottom plate, the bumps and/or the recesses adapted to scrape an insulated layer of a wire and form an electrical connection with the wire;
- a first arm extending from a first end of the first arm to a second end of the first arm, first arm including:
  - a preexisting first tenon and a preexisting first groove that are disposed on the second end of the first arm at a front end of the terminal, the first tenon and the first groove are stacked adjacently; and
  - a dovetail joint arranged on the second end of the first arm and spaced apart from the first tenon and the first groove in a longitudinal direction of the terminal; and
- a second arm extending from a first end of the second arm to a second end of the second arm, the first end of the first arm and the first end of the second arm are respectively coupled to a pair of sides of the bottom plate, and the first arm, the bottom plate, and the second arm form a space adapted to accommodating the wire, the second arm including:
  - a preexisting second groove and a preexisting second tenon that are disposed on the second end of the second arm at the front end of the terminal, the second groove and the second tenon are stacked adjacently, the first tenon is matable with the second groove and the first groove is matable with the second tenon to form a first tenon joint; and
  - a dovetail groove arranged on the second end of the second arm and aligned with the dovetail joint in the longitudinal direction of the terminal.

2. The connecting terminal according to claim 1, wherein the bumps and/or the recesses are adapted to scrape the insulated layer of the wire during ultrasonic welding.

3. The connecting terminal according to claim 1, wherein the first arm includes a first bend portion arranged thereon, and the second arm includes a second bend portion arranged thereon.

4. The connecting terminal according to claim 1, wherein each of the bumps or each of the recesses is circular or polygonal.

5. The connecting terminal according to claim 1, wherein the bumps or the recesses are formed by a stamping or etching process.

6. The connecting terminal according to claim 1, wherein the second end of the first arm is coupled to the second end of the second arm, such that the first arm, the bottom plate, and the second arm form the space.

7. The connecting terminal according to claim 6, wherein a height of the space for accommodating the wire is greater than or equal to an outer diameter of the wire.

8. The connecting terminal according to claim 6, wherein a height of the space for accommodating the wire is less than or equal to twice an outer diameter of the wire.

9. The connecting terminal according to claim 1, wherein the bumps or the surface of the bottom plate is processed by a treatment process that increases a roughness.

10. The connecting terminal according to claim 9, wherein the treatment process is knurling or sand blast.

11. The connecting terminal according to claim 1, wherein the recesses or the surface of the bottom plate is processed by a treatment process that increases a roughness.

12. The connecting terminal according to claim 1, wherein a plurality of inner walls of the first arm and the second arm have the bumps or the recesses arranged thereon.

13. The connecting terminal according to claim 1, wherein the dovetail joint is inserted into the dovetail groove and fixedly mates to the dovetail groove, the dovetail joint arranged between the first and second tenons along a length direction of the connecting terminal.

14. The connecting terminal according to claim 1, wherein the first tenon and the second groove are connected by ultrasonic welding, and the first groove and the second tenon are connected by ultrasonic welding.

15. The connecting terminal according to claim 1, wherein a width of the space for accommodating the wire is greater than or equal to an outer diameter of the wire multiplied by a number of wires.

16. The connecting terminal according to claim 1, wherein a height of the bump or a depth of the recess is less than or equal to one fifth of an outer diameter of the wire.

17. The connecting terminal according to claim 1, wherein a height of the first tenon corresponds to a height of the first groove, and a height of the second tenon corresponds to a height of the second grove such that each tenon is fully received in their respective groove in the height direction.

18. The connecting terminal according to claim 1, wherein:
- the first arm further includes a preexisting third tenon and a preexisting third groove disposed on a rear end of the second end of the first arm, the third tenon and the third groove are stacked adjacently; and
- the second arm further includes a preexisting fourth groove and a preexisting fourth tenon disposed on the rear end of the second end of the second arm, the second groove and the second tenon are stacked adjacently, the third tenon is matable with the fourth groove and the third groove is matable with the fourth tenon to form a second tenon joint, the dovetail joint and the dovetail groove arranged between and spaced apart from the first tenon joint and the second tenon joint in the longitudinal direction of the terminal with the dovetail joint engaged with the dovetail groove.

19. A connecting terminal assembly, comprising:
- a wire;
- a connection terminal, including:
  - a bottom plate having a plurality of protruding strips and a plurality of recesses arranged on a surface of the bottom plate and extending across the bottom plate in a direction transverse to a longitudinal direction of the wire, the protruding strips and the recesses sized and shaped to scrape an insulated layer of the wire and form an electrical connection with the wire via ultrasonic welding;
  - a first arm extending from a first end of the first arm to a second end of the first arm, the first arm having:
    - a first tenon and a first groove formed on a front end of the second end of the first arm, the first tenon and the first groove are stacked adjacently; and
    - a dovetail joint arranged on the second end of the first arm and separated from the first tenon and the first groove in a longitudinal direction of the terminal; and
  - a second arm extending from a first end of the second arm to a second end of the second arm, the first end of the first arm and the first end of the second arm are respectively coupled to a pair of sides of the bottom plate, and the first arm, the bottom plate, and the second arm form a space accommodating the wire.

20. The connecting terminal according to claim 19, wherein a height of the bumps or a depth of the recesses is greater than or equal to a thickness of the insulated layer of the wire.

21. A connecting terminal, comprising:

a bottom portion defining a plurality of protrusions adapted to penetrate an insulated layer of a wire and form an electrical connection with the wire;

a first arm and a second arm extending from the bottom portion and forming a space adapted to accommodating the wire, each of the first arm and the second arm having:

a first tenon and a first groove formed on an end of a respective one of the first arm and the second arm at a front end of the terminal, and stacked adjacently, the first tenons matable with the first grooves to form a first tenon joint; and a second tenon and a second groove formed on the end of a respective one of the first arm and the second arm at a rear end of the terminal, and stacked adjacently, the second tenons matable with the second grooves to form a first tenon joint;

a dovetail joint arranged on the end of the first arm and spaced apart from the first tenon and the second tenon in a longitudinal direction of the terminal; and a dovetail groove arranged on the end of the second arm and aligned with the dovetail joint in the longitudinal direction of the terminal.

* * * * *